US012804562B2

(12) United States Patent
Keating et al.

(10) Patent No.: US 12,804,562 B2
(45) Date of Patent: Nov. 17, 2026

(54) METHOD FOR SL PRS POWER CONTROL TO AVOID INTERFERENCE

(71) Applicant: Nokia Technologies Oy, Espoo (FI)

(72) Inventors: Ryan Keating, Naperville, IL (US); Hyun-Su Cha, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 301 days.

(21) Appl. No.: 18/612,321

(22) Filed: Mar. 21, 2024

(65) Prior Publication Data

US 2024/0340814 A1 Oct. 10, 2024

Related U.S. Application Data

(60) Provisional application No. 63/457,513, filed on Apr. 6, 2023.

(51) Int. Cl.
*H04W 52/38* (2009.01)
*H04W 52/24* (2009.01)
*H04W 52/36* (2009.01)

(52) U.S. Cl.
CPC ....... *H04W 52/383* (2013.01); *H04W 52/242* (2013.01); *H04W 52/367* (2013.01)

(58) Field of Classification Search
CPC ............. H04W 52/383; H04W 52/242; H04W 52/367; H04W 52/283; H04W 64/00; H04W 76/14; H04W 92/18
See application file for complete search history.

(56) References Cited

U.S. PATENT DOCUMENTS 11,889,431 B2 * 1/2024 Wang .................. H04W 52/383
12,232,081 B2 * 2/2025 Huang .................. H04L 5/1469
2015/0050929 A1 2/2015 Song et al.
2016/0174242 A1 6/2016 Fujishiro et al.
2021/0167916 A1 6/2021 Jiang et al.
2021/0185645 A1 6/2021 Huang et al.
2022/0110075 A1 * 4/2022 Zhao .................. H04W 52/242
2022/0110096 A1 4/2022 Lin et al.
2023/0084448 A1 * 3/2023 Sharma ................ H04B 1/7143 375/133

FOREIGN PATENT DOCUMENTS

KR 20220046609 A * 4/2022 .......... H04W 52/367
WO 2022/068610 A1 4/2022

OTHER PUBLICATIONS

Extended European Search Report received for corresponding European Patent Application No. 24167985.1, dated Aug. 26, 2024, 11 pages.

(Continued)

*Primary Examiner* — Curtis A Kuntz
(74) *Attorney, Agent, or Firm* — Carter, DeLuca & Farrell LLP

(57) ABSTRACT

A method including: determining at least one transmission power difference between at least two sidelink positioning reference signal resources; and, based upon the determining of the at least one transmission power difference, transmitting information regarding the determined at least one transmission power difference for use with a receiving user equipment.

1 Claim, 5 Drawing Sheets

(56) References Cited

OTHER PUBLICATIONS

"Reference signal design for sidelink positioning", 3GPP TSG-RAN WG1 #112 , R1-2301636, Agenda: 9.5.1.1, MediaTek Inc., Feb. 27-Mar. 3, 2023, 6 pages.
"Considerations on SL-PRS design",3GPP TSG-RAN WG1 Meeting #112 , R1-2300079, Agenda: 9.5.1.1, Huawei, Feb. 27-Mar. 3, 2023, 9 pages.
"3rd Generation Partnership Project; Technical Specification Group Radio Access Network; NR; Physical layer procedures for data (Release 17)", 3GPP TS 38.214, V17.4.0, Dec. 2022, pp. 1-230.
"3rd Generation Partnership Project; Technical Specification Group Radio Access Network; NR; Physical channels and modulation (Release 17)", 3GPP TS 38.211, V17.4.0, Dec. 2022, pp. 1-136.
"3rd Generation Partnership Project; Technical Specification Group Radio Access Network; LTE Positioning Protocol (LPP) (Release 17)", 3GPP TS 37.355, V17.3.0, Dec. 2022, pp. 1-348.
"New WID on Expanded and Improved NR Positioning", 3GPP TSG RAN Meeting #98-e, RP-223549, Agenda: 9.1.1, Intel Corporation, Dec. 12-16, 2022, pp. 1-7.
"Msc-generator", Sourceforge, Retrieved on Apr. 18, 2024, Webpage available at :https://sourceforge.net/projects/msc-generator/.
"FL summary #4 on SL positioning reference signal", 3GPP TSG RAN WG1 Meeting #112, R1-2302096, Agenda: 9.5.1.1, Intel Corporation, Feb. 27-Mar. 3, 2023, pp. 1-75.
"SL-PRS design and power control for SL-PRS", 3GPP TSG RAN WG1 #112, R1-2301116, Agenda: 9.5.1.1, InterDigital Inc., Feb. 27-Mar. 3, 2023, 11 pages.
"Reference Signal Design for SL Positioning", 3GPP TSG RAN WG1 #112, R1-2301417, Agenda: 9.5.1.1, Qualcomm Incorporated, Feb. 27-Mar. 3, 2023, pp. 1-5.

* cited by examiner

METHOD FOR SL PRS POWER CONTROL TO AVOID INTERFERENCE

CROSS-REFERENCE TO RELATED APPLICATIONS

This application claims priority to, and the benefit of, U.S. provisional application No. 63/457,513 filed 6 Apr. 2023, which is incorporated herein by reference in its entirety.

TECHNICAL FIELD

The example and non-limiting embodiments relate generally to sidelink communication and, more particularly, to positioning reference signals.

BACKGROUND

Sidelink communication between user equipments is known which uses positioning reference signals.

SUMMARY OF THE INVENTION

The following summary is merely intended to be an example. The summary is not intended to limit the scope of the claims.

In accordance with one aspect, an example method is provided comprising: determining at least one transmission power difference between at least two sidelink positioning reference signal resources; and based upon the determining of the at least one transmission power difference, sending information regarding the determined at least one transmission power difference for use with a receiving user equipment.

In accordance with another aspect, an example apparatus is provided comprising: at least one processor; and at least one non-transitory memory storing instructions that, when executed with the at least one processor, cause the apparatus to perform: determining at least one transmission power difference between at least two sidelink positioning reference signal resources; and, based upon the determining of the at least one transmission power difference, transmitting information regarding the determined at least one transmission power difference for use with a receiving user equipment.

In accordance with another aspect, an example apparatus is provided comprising: means for determining at least one transmission power difference between at least two sidelink positioning reference signal resources; and means for, based upon the determined of the at least one transmission power difference, transmitting information regarding the determined at least one transmission power difference for use with a receiving user equipment.

In accordance with another aspect, an example non-transitory program storage device readable by an apparatus is provided, tangibly embodying a program of instructions executable with the apparatus for performing operations, the operations comprising: determining at least one transmission power difference between at least two sidelink positioning reference signal resources; and based upon the determining of the at least one transmission power difference, causing transmitting of information regarding the determined at least one transmission power difference for use with a receiving user equipment.

In accordance with another aspect, an example method is provided comprising: receiving information regarding at least one transmission power difference between at least two sidelink positioning reference signal resources; and based upon the received information, determining whether or not to take at least one predetermined action.

In accordance with another aspect, an example apparatus is provided comprising: at least one processor; and at least one non-transitory memory storing instructions that, when executed with the at least one processor, cause the apparatus to perform: receiving information regarding at least one transmission power difference between at least two sidelink positioning reference signal resources; and based upon the received information, determining whether to take at least one predetermined action.

In accordance with another aspect, an example apparatus is provided comprising: means for receiving information regarding at least one transmission power difference between at least two sidelink positioning reference signal resources; and based upon the received information, determining whether to take at least one predetermined action.

In accordance with another aspect, an example non-transitory program storage device readable by an apparatus is provided, tangibly embodying a program of instructions executable with the apparatus for performing operations, the operations comprising: receiving information regarding at least one transmission power difference between at least two sidelink positioning reference signal resources; and based upon the received information, determining whether to take at least one predetermined action.

According to some aspects, there is provided the subject matter of the independent claims. Some further aspects are provided in subject matter of the dependent claims.

BRIEF DESCRIPTION OF DRAWINGS

The foregoing aspects and other features are explained in the following description, taken in connection with the accompanying drawings, wherein.

DETAILED DESCRIPTION

Figure 1:
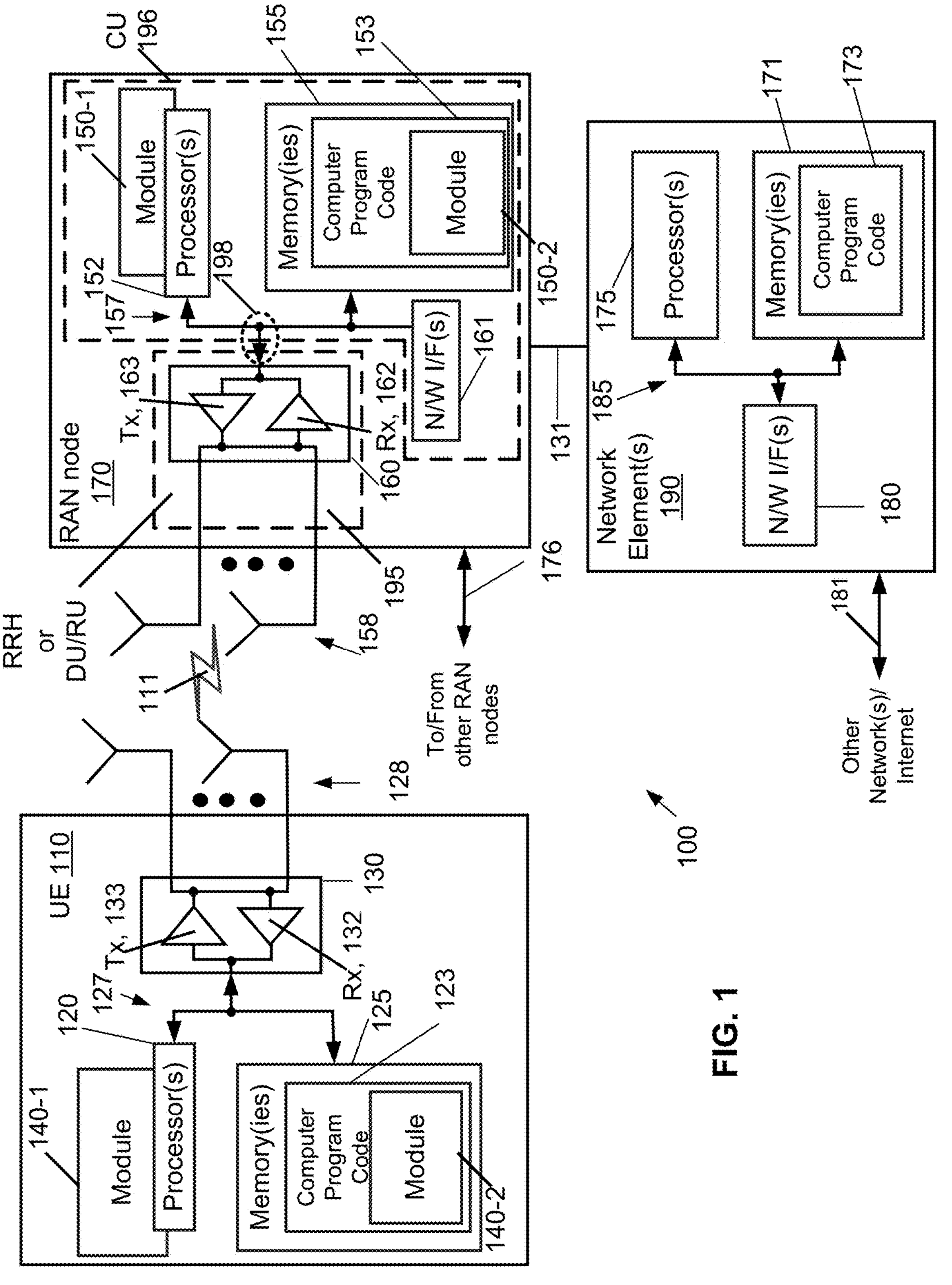
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
ACK acknowledgement
AGC Automatic Gain Control
AMF access and mobility management function
CSI-RS channel state information reference signal
CU central unit
DL downlink
DMRS demodulation reference signal
DU distributed unit eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDM frequency division multiplex
FFS for further study
gNB (or gNodeB) base station for 5G/NR, i.e., a node providing NR user plane and control plane protocol terminations towards the UE, and connected via the NG interface to the 5GC
I/F interface
IUC inter UE coordination
LMF location management function
LTE long term evolution
MAC medium access control
MAC-CE medium access control-control element
MME mobility management entity
NACK negative acknowledgement
ng or NG new generation
ng-eNB or NG-eNB new generation eNB
NR new radio
N/W or NW network
OLPC open loop power control
PC5 a type of direct interface, where the UE directly communicates with another UE over a direct channel
PDCP packet data convergence protocol
PHY physical layer
PL RS pathloss reference signal
PRS positioning reference signal
PSCCH physical sidelink control channel
PSSCH physical sidelink shared channel
RAN radio access network
Rel release
Rel-18 release 18
RLC radio link control
RRH remote radio head
RRC radio resource control
RS reference signal
RU radio unit
Rx receiver
SCI sidelink control information
SDAP service data adaptation protocol
SGW serving gateway
SL sidelink
SL RSTD sidelink reference signal time difference
SL RTOA sidelink relative time of arrival
SL Rx-Tx sidelink receive transmit time difference
SLPP sidelink positioning protocol
SL PRS sidelink positioning reference signal
SMF session management function
SRS sounding reference signal
SSB Synchronization Signal Block
TDM time division multiplexing
TDOA time difference of arrival
TPC transmit power control
TS technical specification
Tx transmitter
UE user equipment (e.g., a wireless, typically mobile device)
UL uplink
UPF user plane function
Uu an air interface, such as used with a cellular network, such as NR-Uu for example
V2X vehicle-to-everything
WID work item description Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that “cells” perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station’s coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

In 3GPP, and specifically Rel-18 regarding NR positioning, a WID (RP-223549) was agreed, and it includes sidelink positioning.

Figure 2:
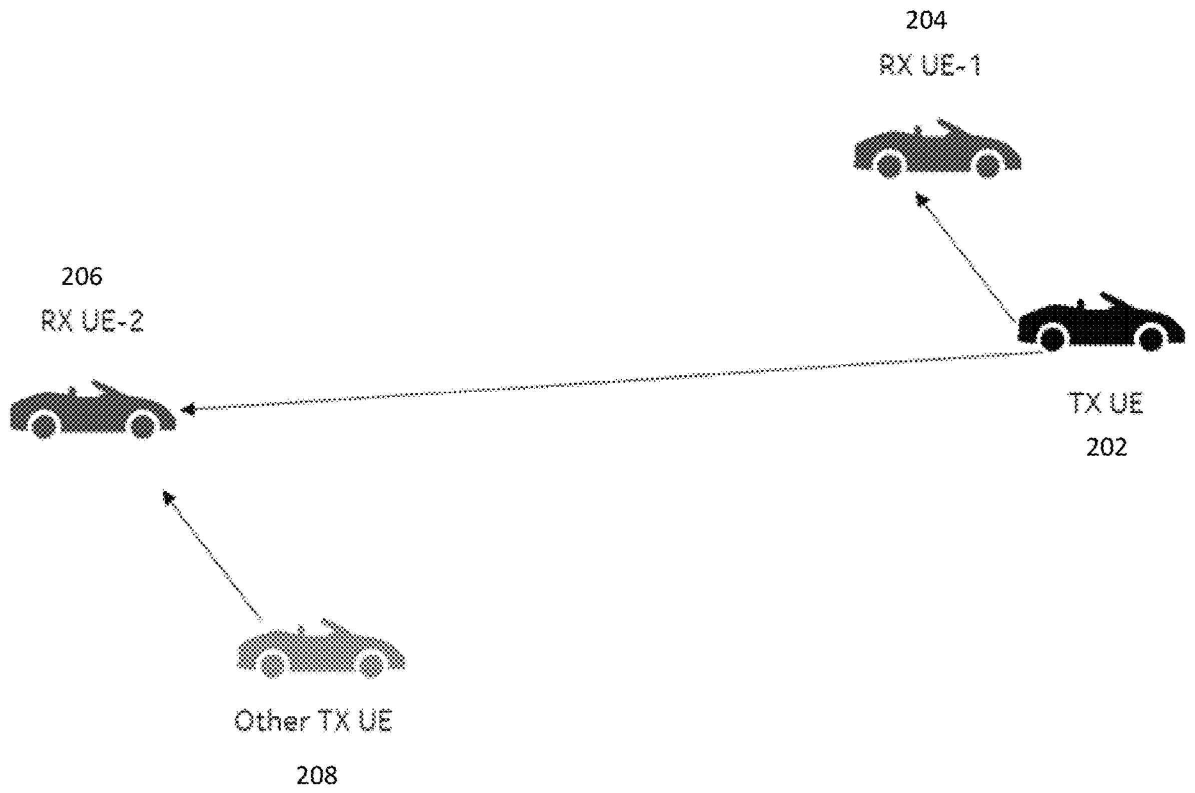
FIG. 2 is a diagram illustrating an example of sidelink communication.

In sidelink (SL) positioning for many use cases it is necessary to involve multiple anchor UEs in order to find the location of a target UE. So, in order to find the location of a target UE, the target UE may be involved in a positioning session with a set of other UEs at a given time. The situation becomes even more complex when there are simultaneously many target UEs at a same time. SL positioning is the location estimation of a specific target UE using sidelink (SL). For this purpose, NR introduces SL positioning reference signal (SL PRS). This is a new type of reference signal in sidelink. It is a dedicated reference signal to be used to obtain positioning measurements such as timing, angle, power measurements. Transmitting UEs and/or receiving UEs can report the obtained measurement to the location estimation entity (e.g., LMF). In SL based positioning the sidelink positioning reference signal (SL PRS) may be broadcast or groupcast to multiple UEs which are performing positioning. In such a case there can be a near-far problem within one group or by two (or more) UEs which are receiving the same SL PRS in broadcast. Referring also to FIG. 2, an example is shown of when a transmitting UE 202 is sending SL PRS to multiple other UEs 204, 206. In this Figure the "other TX UE" 208 is also transmitting SL PRS. As can be seen, the other TX UE 208 is much closer to the receiving UE 206 than the transmitting UE 202. Thus, at RX UE-2, UE 206, the power level of the SL PRS from the Other TX UE (208) and the TX UE (202) could be very different. Features as described herein may be used to solve an issue created because of the different power levels. This may be addressed by configured multiple SL PRS resources with each resource. This may comprise configuring multiple SL PRS resources such as using pathloss reference of one of the RX UEs such as 204 or 206 for example. However, in doing so the Tx UE 202 may cause some problems at Rx UE-2 206; the UE which is receiving transmissions from both TX UE 202 and the other TX UE 208. For example, this may happen when a SL PRS intended for Rx UE-1 204 from TX UE 202 is transmitted at a same time as a SL PRS from the other TX UE 208. So, with features as described herein, in one example embodiment the TX UE 202 may indicate the power difference between the multiple SL PRS resources to one or more of the multiple receiving UEs, such as 206 and perhaps also 204 for example.

In Uu positioning the sounding reference signal (SRS) for positioning has one pathloss reference per SRS resource set. If a similar SL PRS resource set concept is introduced in SL (as has been proposed/discussed with regard to Rel-18), then the pathloss reference may also be configured per SL PRS resource set. This is problematic in the near-far situation described above with regard to RX UE-2 206 and the two TX UEs 202, 208.

To address this issue, the SL PRS pathloss reference may be configured per resource. However, this creates the additional issue that a given UE may not understand the transmission power associated with different SL PRS resources because the average received signal power could be highly different depending on the SL PRS resources. This can complicate the receiving procedure at a given UE, and may also cause issues with dynamic range such as distortion of the received SL PRS for example. Features as described herein may be used to address these issues.

In SL communications the UE may be configure with SL RS or DL RS for pathloss reference. In Uu positioning the UE may be configured with PL RS for the SRS for positioning at the resource set level. In Uu the near-far problem can be solved by either using multiple SRS resource sets or by using beamforming (if the UE is capable of doing so). The main difference in Uu is that the serving gNB is concerned about interference in its own cell and controls the power more tightly based on this constraint. Note that in all positioning simulation assumptions in 3GPP we assume full UE power, but that is not completely realistic in practical system.

In Uu positioning the near-far problem can be solved with a number of tools. Namely 1) multiple SRS resource sets, 2) using beamforming at UE if applicable, 3) controlling transmit power control (TPC) parameters from gNB side (alpha and beta). However, none of these tools are directly applicable to SL. For 1) the SL PRS resource set has not yet been agreed to be introduced. For 2) SL does not yet have beam management and for positioning we will not specify things specially for FR2. For 3) there is no centralized entity, such as gNB, which can control TPC parameters in SL. So, especially in an out of coverage case where UEs need to coordinate their transmission, this is a new problem for SL positioning. In SL communication the UE can use ACK-NACK to help inform of any issues, but that does not apply to SL positioning.

Features as described herein may be used with a method for transmitting power control procedures during SL PRS transmission. This may be used to address interference caused by the near-far issue noted above.

In one example embodiment, with an anchor or target UE involved in a SL positioning session, the target UE may transmit SL PRS to multiple other UEs via a broadcast or groupcast. For simplicity, the target UE will be referred to below as the "transmitting UE". The transmitting UE could be an anchor UE (for example, in the case of DL-TDOA, such as SL-TDOA) or could be a target UE (for example, in the case of UL-TDOA, such as SL-TDOA).

Figure 2A:
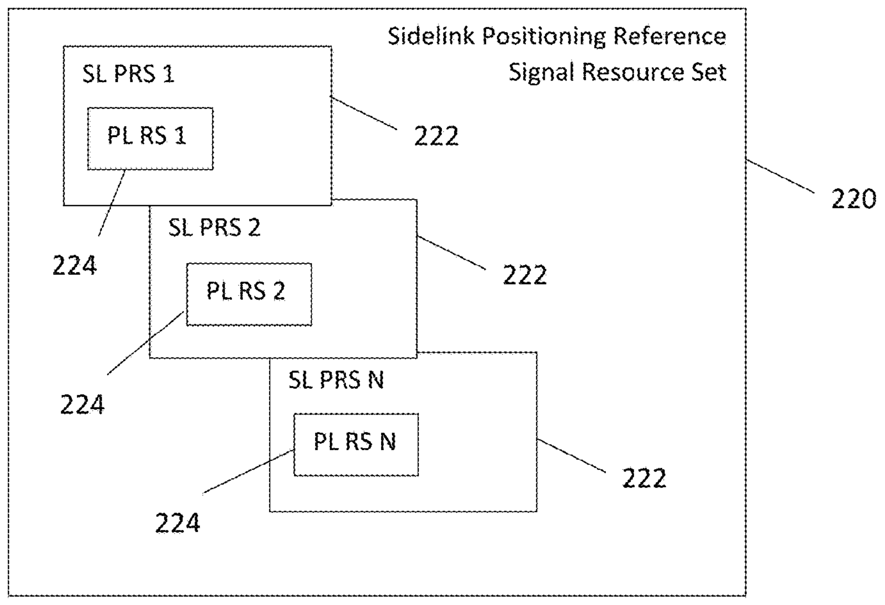
FIG. 2A is a diagram illustrating a sidelink positioning reference signal resource set.

Referring also to FIG. 2A, the transmitting UE may configure a sidelink positioning reference signal (SL PRS) resource set 220 with multiple SL PRS resources 222, and each SL PRS resource may have a different pathloss reference signal (PL RS) 224. In FIG. 2A, there is a first sidelink positioning reference signal SL PRS 1 with a first pathloss reference signal PL RS 1, a second sidelink positioning reference signal SL PRS 2 with a different second pathloss reference signal PL RS 2, and one or more optional additional sidelink positioning reference signal SL PRS N with different pathloss reference signal PL RS N, where "N" is a whole number after 2. All the resources in the set 220 may be configured at a same time.

The configuration may involve input from UEs in the group or UEs receiving the broadcast (such as via IUC for example). The PL RS may be the SL PRS of the receiving UEs, SL SSB, or SL CSI-RS for example. In SL every transmission is reserved by use of SCI. This indicates to all UEs in the systems that a given UE plans to use resources for transmission. So, in this case every receiving UE will receive the resource allocation for every SL PRS resource.

The transmitting UE may determine the pathloss associated with each PL RS and also determine the difference in transmit power for the different SL PRS resources with the SL PRS resource set. The UE may determine the power of each SL PRS resource such as based on the pathloss reference, other power control procedures, and maximum transmit power. In one example embodiment, the UE can then calculate the difference of the power levels simply by subtracting them. One of the examples of another power control procedure would be uu-link based power control. The transmitting UE may try to determine the power of each SL PRS resource based on downlink pathloss reference signals configured from the gNB.

The transmitting UE may then inform the receiving UEs about the differences in transmission power. The transmitting UE may include this information in a second stage SCI, MAC-CE, PSSCH for groupcast, or SLPP messages for example. There are various options which may be used. In a first example option, the transmitting UE may include the information on the transmission powers directly in the SL PRS configuration. For example, the transmitting UE may report the transmission power in dBm of the SL PRS resources. In a second example option, the transmitting UE may include the relative power between SL PRS resources within a SL PRS resource set. For example, the transmitting UE may select a first SL PRS resource as the power reference and include the delta (difference) to that power along with the configuration of the other resources in the set. The UE may then provide a signal, such as for example:

SL PRS resource #0 is the power reference,

SL PRS resource #1 is X dB higher in transmit power than the reference,

SL PRS resource #2 is Y dB lower in transmit power than the reference, etc.

In a third example option, the transmitting UE may include in the SL PRS configuration the used path-loss RS information associated with a SL-PRS resource. For example, one or multiple path-loss RSs transmitted from one or multiple UEs may be a path-loss reference of each SL PRS resource. Each UE may be able to know the preferable SL PRS resources.

After the transmitting noted above, the receiving UEs may then receive this transmission power information as part of SL PRS configuration, and then determine if any issues with the receiver may arise. For example, an issue might arise where a nearby UE may have problems with a very strong resource in the set. In one example embodiment, the receiving UE may indicate to the transmitting UE that there is a problematic configuration and ask the transmitting UE to change the configuration and/or the transmit power of a particular SL PRS resource. In another embodiment, the receiving UE may ignore certain symbols/slots where the problematic SL PRS is present.

The transmitting UE may transmit the SL PRS resource set following the indicated configuration.

The UEs may measure the positioning measurements from the SL PRS resources, such as SL RTOA, SL RSTD, SL Rx-Tx, and/or angle of arrival, and may reports the measurements to the location server or another entity computing the location of a target UE.

Figure 3:
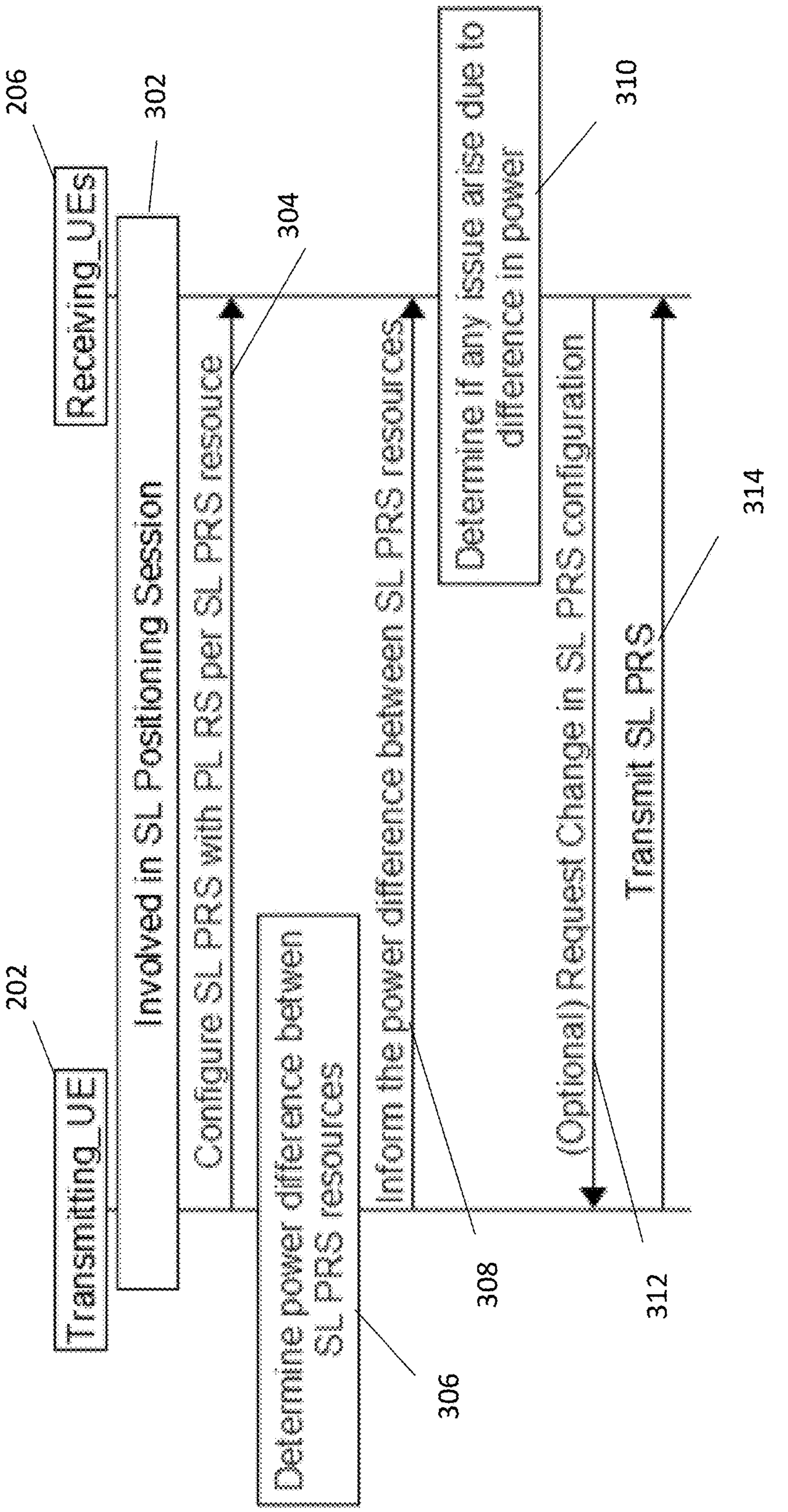
FIG. 3 is a signaling diagram illustrating one example of a method.
Figure 4:
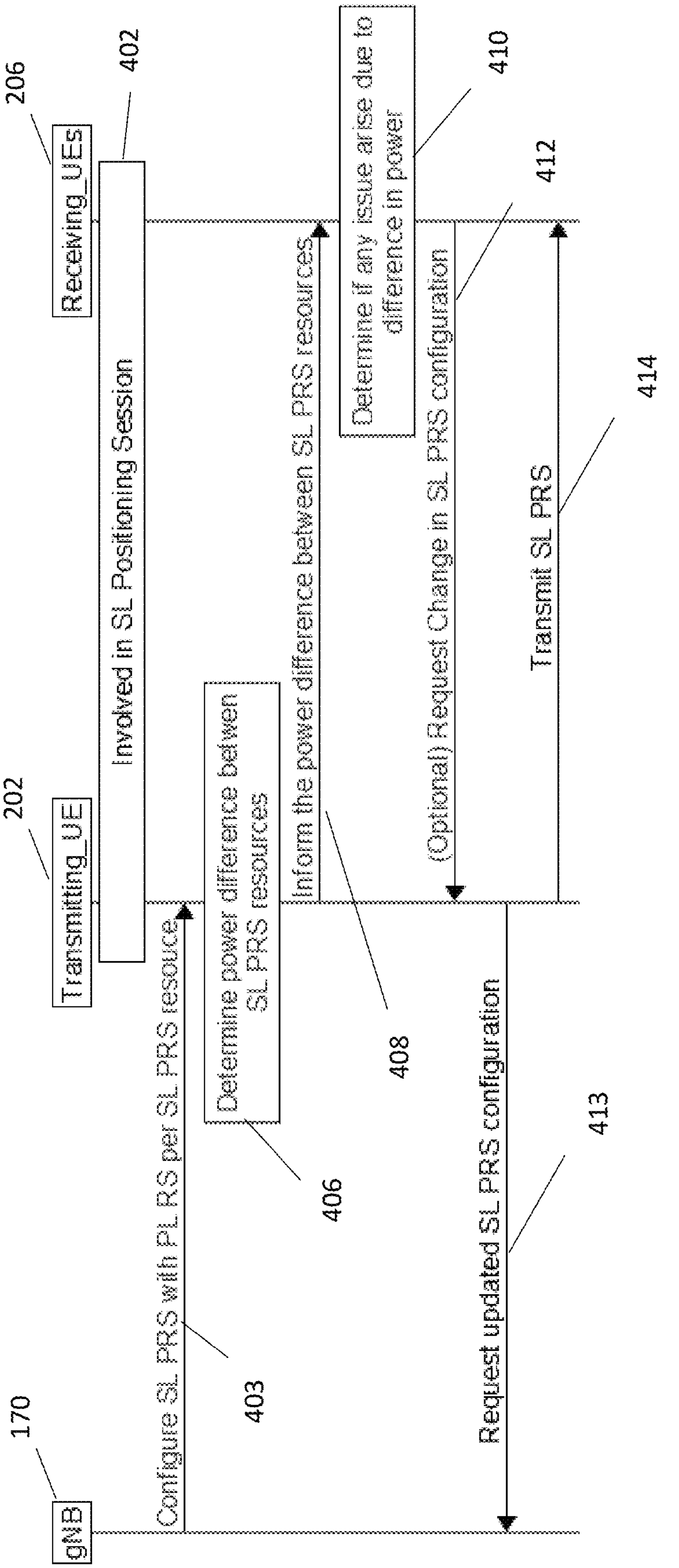
FIG. 4 is a signaling diagram illustrating one example of a method.

Reference will now be made to FIGS. 3 and 4 where two example schemes or situations will be described: a first situation (FIG. 3) where the network/gNB/LMF is not involved in the SL positioning procedure, and a second situation (FIG. 4) where the LMF/gNB/network is involved in the SL positioning procedure.

As illustrated with FIG. 3, with the transmitting UE 202 and the receiving UE(s) 206 involved in a SL positioning session as indicated at 302, the transmitting UE 202 may signal the receiving UE(s) 206 to configure sidelink positioning reference signal (SL PRS) with pathloss reference signal (PL RS) per SL PRS resource as indicated at 304. So, as illustrated with FIG. 3, the transmitting UE 202 determines the PRS configuration itself locally, and then with 304 sends that configuration to the receiving UE 206. As indicated at 306, the transmitting UE 202 may determine power difference(s) between SL PRS resources. As indicated at 308, the transmitting UE 202 may provide a signal(s) informing the receiving UE(s) 206 of the power difference (s) between the SL PRS resources. The receiving UE(s) 206 may then determine if any issue may arise due to the difference(s) in power as indicated at 310. As indicated at 314, the transmitting UE 202 may transmit the SL PRS to the receiving UE(s) 206. As an optional step, as indicated at 312, the receiving UE(s) 206 may signal the transmitting UE 202 requesting a change in SL PRS configuration. It should be noted that step 308, regarding the power difference information, is shown in FIG. 3 as a separate message or signal. However, in an alternate example embodiment, this power difference information could optionally be included elsewhere, such as part of the SL PRS configuration step 304 for example.

As illustrated with FIG. 4, with the transmitting UE 202 and the receiving UE(s) 206 involved in a SL positioning session as indicated at 402, the gNB 170 may send a signal 403 to the transmitting UE 202 with information to configure sidelink positioning reference signal (SL PRS) with pathloss reference signal (PL RS) per SL PRS resource. So, as illustrated with FIG. 4, the transmitting UE 202 first receives the PRS configuration from the gNB as illustrated with 403, and then it sends the configuration to the receiving UEs 206. As indicated at 406, the transmitting UE 202 may determine power difference(s) between SL PRS resources. As indicated at 408, the transmitting UE 202 may provide a signal(s) informing the receiving UE(s) 206 of the power difference(s) between the SL PRS resources. The receiving UE(s) 206 may then determine if any issue may arise due to the difference(s) in power as indicated at 410. As indicated at 413, the transmitting UE 202 may send a request to the gNB 170 to update SL PRS configuration. As indicated at 414, the transmitting UE 202 may transmit the SL PRS to the receiving UE(s) 206. As an optional step, as indicated at 412, the receiving UE(s) 206 may signal the transmitting UE 202 requesting a change in SL PRS configuration. It should be noted that step 408, regarding the power difference information, is shown in FIG. 4 as a separate message or signal. However, in an alternate example embodiment, this power difference information could optionally be included elsewhere.

With features as described herein, a better measurement accuracy may be provided by avoiding unexpected signal distortion at the receiver. In additions, with features as described herein a complicated receiving mechanism to find the received signal with too different average power level may be avoided.

With features as described herein, a pathloss reference signal in SL positioning may be configured per SL PRS resource (not per resource set as in Uu positioning). The transmitting UE may determine and transmit to the receiving UEs for the transmit power differences between different SL PRS resources. Non-limiting examples include:

Option 1: Transmitting UE includes the transmission power in dBm of the SL PRS resources in the SL PRS configuration.

Option 2: Transmitting UE includes the relative power between SL PRS resources within a SL PRS resource set. The SL PRS resource set includes the SL PRS configuration(s) of the SL PRS resource(s) in the set.

Option 3: Transmitting UE includes in the SL PRS configuration the used path-loss RS information associated with a SL-PRS resource.

If the receiving UE determines that there is an issue arising with the receiving UE, it may send an indication to the transmitting UE and ask the transmitting UE to change the configuration or transmission power of a particular SL PRS resource.

In the above description it was assumed that the PL RS is configured per SL PRS resource. However, in an alternate embodiment it is possible that the PL RS ends up being configured per SL PRS resource set. In this case the UE can still indicate the power difference information between different sets. If multiple SL PRS resource sets are configured for groupcast or broadcast, the anchor UE may include the information on differences in transmission power between different SL PRS resource sets. The Transmitting_UE (Tx UE) may send multiple different resource sets 220 to the Receiving_UE (Rx UE). Each resource set may have an associated PL RS which is configured by the Transmitting_UE to the Receiving_UE.

Figure 5:
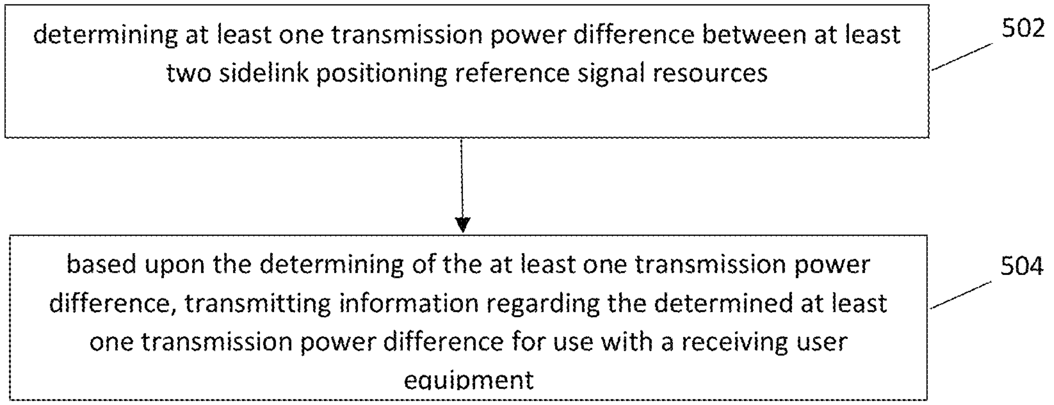
FIG. 5 is a flow diagram illustrating one example method.

Referring also to FIG. 5, an example embodiment may be provided with a method comprising: determining at least one transmission power difference between at least two sidelink positioning reference signal resources as indicated with block 502; and based upon the determining of the at least one transmission power difference, sending information regarding the determined at least one transmission power difference for use with a receiving user equipment as indicated with block 504.

The determining of the at least one transmission power difference may comprise using pathloss reference signals. The determining of the at least one transmission power difference may comprise determining transmission power of the sidelink positioning reference signal resources based at least partially upon the pathloss reference signals. The determining of the at least one transmission power difference may comprise use of a maximum transmission power and at least one other power control procedure. The method may further comprise configuring a sidelink positioning reference signal resource set, where the sidelink positioning reference signal resource set comprises a plurality of the sidelink positioning reference signal resources. The method may further comprise transmitting the sidelink positioning reference signal resource set to the receiving user equipment. The method may further comprise receiving a change request for a sidelink positioning reference signal resources configuration including transmission power from the receiving user equipment. The method may further comprise, based at least partially upon the received change request, configuring a new (different and revised or updated) sidelink positioning reference signal resource and transmitting the new sidelink positioning reference signal resource to the receiving user equipment. The information, regarding the determined at least one transmission power difference, may comprise information on a transmission power directly in a sidelink positioning reference signal resource configuration. The information on the transmission power directly in the sidelink positioning reference signal resource configuration may comprise the transmission power in dBm of the sidelink positioning reference signal resource. The information, regarding the determined at least one transmission power difference, may comprise information on relative power between sidelink positioning reference signal resources within a sidelink positioning reference signal resource set. The information, regarding the determined at least one transmission power difference, may comprise a sidelink positioning reference signal resources configuration comprising pathloss reference signal information associated with the sidelink positioning reference signal resource. The method may further comprise configuring a respective pathloss reference signal for the at least two sidelink positioning reference signal resources.

An example embodiment may be provided with an apparatus comprising: at least one processor; and at least one non-transitory memory storing instructions that, when executed with the at least one processor, cause the apparatus to perform: determining at least one transmission power difference between at least two sidelink positioning reference signal resources; and, based upon the determining of the at least one transmission power difference, transmitting information regarding the determined at least one transmission power difference for use with a receiving user equipment.

The determining of the at least one transmission power difference may comprise using pathloss reference signals. The determining of the at least one transmission power difference may comprise determining transmission power of the sidelink positioning reference signal resources based at least partially upon the pathloss reference signals. The determining of the at least one transmission power difference may comprise use of a maximum transmission power and at least one other power control procedure. The instructions, when executed with the at least one processor, may cause the apparatus to perform configuring a sidelink positioning reference signal resource set, where the sidelink positioning reference signal resource set comprises a plurality of the sidelink positioning reference signal resources. The instructions, when executed with the at least one processor, may cause the apparatus to perform transmitting the sidelink positioning reference signal resource set to the receiving user equipment. The instructions, when executed with the at least one processor, may cause the apparatus to perform receiving a change request for a sidelink positioning reference signal resources configuration including transmission power from the receiving user equipment. The instructions, when executed with the at least one processor, may cause the apparatus to perform, based at least partially upon the received change request, configuring a new sidelink positioning reference signal resource and transmitting the new sidelink positioning reference signal resource to the receiving user equipment. The information, regarding the determined at least one transmission power difference, may comprise information on a transmission power directly in a sidelink positioning reference signal resource configuration. The information on the transmission power directly in the sidelink positioning reference signal resource configuration may comprise the transmission power in dBm of the sidelink positioning reference signal resource. The information, regarding the determined at least one transmission power difference, may comprise information on relative power between sidelink positioning reference signal resources within a sidelink positioning reference signal resource set. The information, regarding the determined at least one transmission power difference, may comprise a sidelink positioning reference signal resource configuration comprising pathloss reference signal information associated with the sidelink positioning reference signal resource. The instructions, when executed with the at least one processor, may cause the apparatus to perform configuring a respective pathloss reference signal for the at least two sidelink positioning reference signal resources.

An example embodiment may be provided with an apparatus comprising: means for determining at least one transmission power difference between at least two sidelink positioning reference signal resources; and means for, based upon the determined of the at least one transmission power difference, transmitting information regarding the determined at least one transmission power difference for use with a receiving user equipment.

An example embodiment may be provided with a non-transitory program storage device readable by an apparatus, tangibly embodying a program of instructions executable with the apparatus for performing operations, the operations comprising: determining at least one transmission power difference between at least two sidelink positioning reference signal resources; and, based upon the determining of the at least one transmission power difference, causing transmitting of information regarding the determined at least one transmission power difference for use with a receiving user equipment.

Figure 6:
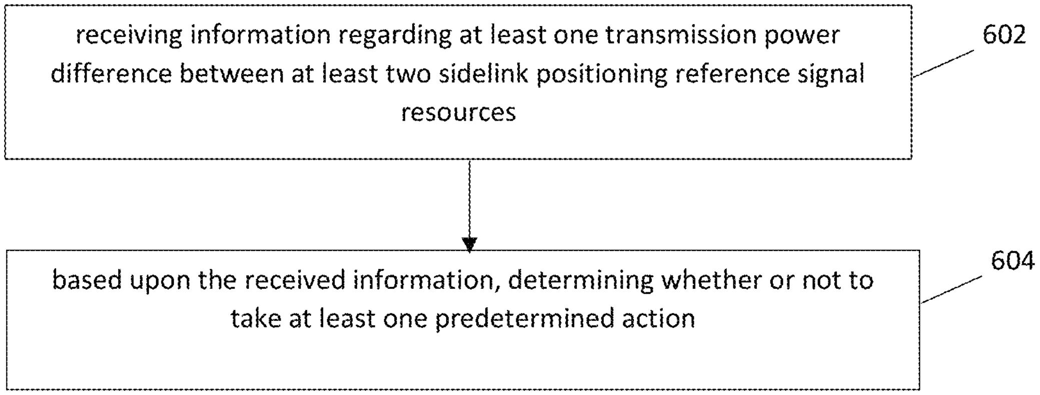
FIG. 6 is a flow diagram illustrating one example method.

Referring also to FIG. 6, an example embodiment may be provided with a method comprising: receiving information regarding at least one transmission power difference between at least two sidelink positioning reference signal resources as indicated with block 602; and based upon the received information, determining whether or not to take at least one predetermined action as indicated with block 604.

The at least one predetermined action may comprise determining there is a problematic configuration to receive one of the sidelink positioning reference signal resources based on the at least one transmission power difference. The at least one predetermined action may comprise requesting a change to at least one of a configuration or at least one of the transmission power. The at least one predetermined action may comprise ignoring at least one symbols or slots where the problematic sidelink positioning reference signal resource configuration is present. The received information may comprise information on the transmission power directly in the sidelink positioning reference signal resource configuration comprising the transmission power in dBm of the sidelink positioning reference signal resource. The received information may comprise information on relative power between sidelink positioning reference signal resources within a sidelink positioning reference signal resource set. The received information may comprise a sidelink positioning reference signal resource configuration comprising used pathloss reference signal information associated with the sidelink positioning reference signal resource.

An example embodiment may be provided with an apparatus comprising: at least one processor; and at least one non-transitory memory storing instructions that, when executed with the at least one processor, cause the apparatus to perform: receiving information regarding at least one transmission power difference between at least two sidelink positioning reference signal resources; and based upon the received information, determining whether to take at least one predetermined action.

The at least one predetermined action may comprise determining there is a problematic configuration to receive one of the sidelink positioning reference signal resources based on the at least one transmission power difference. The at least one predetermined action may comprise requesting a change to at least one of a configuration or at least one of the transmission power. The at least one predetermined action may comprise ignoring at least one symbols or slots where the problematic sidelink positioning reference signal resource configuration is present. The received information may comprise information on the transmission power directly in the sidelink positioning reference signal resource configuration comprising the transmission power in dBm of the sidelink positioning reference signal resource. The received information may comprise information on relative power between sidelink positioning reference signal resources within a sidelink positioning reference signal resource set. The received information may comprise information comprises a sidelink positioning reference signal resource configuration comprising used pathloss reference signal information associated with the sidelink positioning reference signal resource.

An example embodiment may be provided with an apparatus comprising: means for receiving information regarding at least one transmission power difference between at least two sidelink positioning reference signal resources; and means for, based upon the received information, determining whether to take at least one predetermined action.

An example embodiment may be provided with a non-transitory program storage device readable by an apparatus, tangibly embodying a program of instructions executable with the apparatus for performing operations, the operations comprising: receiving information regarding at least one transmission power difference between at least two sidelink positioning reference signal resources; and, based upon the received information, determining whether to take at least one predetermined action.

The term "non-transitory," as used herein, is a limitation of the medium itself (i.e., tangible, not a signal) as opposed to a limitation on data storage persistency (e.g., RAM vs. ROM).

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
(i) a combination of analog and/or digital hardware circuit (s) with software/firmware and
(ii) any portions of hardware processor(s) with software (including digital signal processor(s)), software, and memory (ies) that work together to cause an apparatus, such as a mobile phone or server, to perform various functions) and
(iii) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus, comprising:

at least one processor; and at least one non-transitory memory storing instructions that, when executed with the at least one processor, cause the apparatus to:

operate as a transmitting user equipment involved in a sidelink positioning session with a plurality of receiving user equipments;

configure a sidelink positioning reference signal resource set, wherein the sidelink positioning reference signal resource set comprises a plurality of sidelink positioning reference signal resources, the plurality of sidelink positioning reference signal resources being for broadcast or groupcast transmission to the plurality of receiving user equipments;

configure a respective pathloss reference signal for at least two sidelink positioning reference signal resources of the plurality of sidelink positioning reference signal resources, wherein the respective pathloss reference signal is configured per sidelink positioning reference signal resource and comprises at least one of a sidelink positioning reference signal of one of the receiving user equipments, a sidelink synchronization signal block, or a sidelink channel state information reference signal;

determine at least one transmission power difference between the least two sidelink positioning reference signal resources, wherein the determining of the at least one transmission power difference is based at least partially on pathloss reference signals and uses a maximum transmission power and at least one other power control procedure, wherein determining the at least one transmission power difference comprises determining a transmission power of each of the at least two sidelink positioning reference signal resources based on a corresponding pathloss reference signal and calculating the at least one transmission power difference by subtracting the determined transmission powers;

based upon the determining of the at least one transmission power difference, transmit information regarding the determined at least one transmission power difference for use with a receiving user equipment, wherein the information is transmitted in at least one of second stage sidelink control information, a medium access control-control element, a physical sidelink shared channel for groupcast, or a sidelink positioning protocol message, wherein the information comprises:

information on a transmission power directly in a sidelink positioning reference signal resource configuration, wherein the information on the transmission power directly in the sidelink positioning reference signal resource configuration comprises the transmission power in dBm of a sidelink positioning reference signal resource, information on relative power between sidelink positioning reference signal resources within the sidelink positioning reference signal resource set, wherein a first sidelink positioning reference signal resource is selected as a power reference and the relative power comprises a difference in dB relative to the power reference for another sidelink positioning reference signal resource within the sidelink positioning reference signal resource set, and a sidelink positioning reference signal resource configuration comprising pathloss reference signal information associated with a sidelink positioning reference signal resource;

receive a change request for a sidelink positioning reference signal resource configuration including transmission power from the receiving user equipment, wherein the change request indicates a problematic configuration arising at the receiving user equipment due to the at least one transmission power difference;

based at least partially upon the received change request, configure an updated different sidelink positioning reference signal resource and transmit the updated different sidelink positioning reference signal resource to the receiving user equipment; and transmit the sidelink positioning reference signal resource set to the receiving user equipment.

* * * * *